US007035459B2

(12) United States Patent
Ishiga

(10) Patent No.: US 7,035,459 B2
(45) Date of Patent: Apr. 25, 2006

(54) IMAGE COMPRESSION APPARATUS AND IMAGE COMPRESSION PROGRAM

(75) Inventor: Kenichi Ishiga, Kawasaki (JP)

(73) Assignee: Nikon Corporation, Tokyo (JP)

( * ) Notice: Subject to any disclaimer, the term of this patent is extended or adjusted under 35 U.S.C. 154(b) by 720 days.

(21) Appl. No.: 10/141,854

(22) Filed: May 10, 2002

(65) Prior Publication Data

US 2003/0026477 A1 Feb. 6, 2003

(30) Foreign Application Priority Data

May 14, 2001 (JP) .............................. 2001-143675

(51) Int. Cl.
*G06K 9/00* (2006.01)
*G06K 9/36* (2006.01)

(52) U.S. Cl. ...................... 382/166; 382/239; 382/299

(58) Field of Classification Search ................ 382/166, 382/239, 299
See application file for complete search history.

(56) References Cited

U.S. PATENT DOCUMENTS

| 5,517,581 | A | | 5/1996 | Johnston et al. | |
|---|---|---|---|---|---|
| 5,798,794 | A | | 8/1998 | Takahashi | |
| 5,822,465 | A | * | 10/1998 | Normile et al. | ............. 382/239 |
| 6,650,773 | B1 | | 11/2003 | Maurer et al. | |

FOREIGN PATENT DOCUMENTS

| JP | 09-135462 | 5/1997 |
|---|---|---|
| JP | 2000-333015 | 11/2000 |
| JP | 2001-61148 | 6/2001 |

OTHER PUBLICATIONS

JPEG 2000 Image Coding System. JPEG 2000 Committee Draft Version 1.0, Dec. 9, 1999, pp. 123-124, 81-82.
JPEG 2000 Image Compression Fundamentals, Standards and Practice. David S. Taubman and Michael W. Marcellin, Kluwer Academic Publishers, pp. 570-572, 628-631 and 729-730.
JPEG Still Image Data Compression Standard. William B. Pennebaker and Joan L. Mitchell, Van Nostrand Reinhold, pp. 23-25 and 101-105.

* cited by examiner

*Primary Examiner*—Phuoc Tran
(74) *Attorney, Agent, or Firm*—Morgan Lewis & Bockius LLP

(57) ABSTRACT

An image compression apparatus for compressing image data that includes luminance signal and chrominance signals includes an image judgement part that judges characterizing features of the image data on the basis of the luminance signal and/or chrominance signals, a subsampling rate setting part which sets the subsampling rate of the chrominance signals in accordance with the characterizing features thus judged, a subsampling processing part which performs subsampling processing of the image data at the set subsampling rate, and a compression encoding part which subjects the subsampling-processed image data to compression encoding.

9 Claims, 8 Drawing Sheets

JPEG COMPRESSION

| CLASSIFICATION INDEX S1 | TARGET COMPRESSION RATE | | |
|---|---|---|---|
| | 4 bpp | 2 bpp | 1 bpp |
| $0 \leq S1 < 0.7$ | 4:4:4 | 4:4:4 | 4:2:0 |
| $0.7 \leq S1 \leq 1$ | 4:4:4 | 4:2:0 | 4:2:0 |

CLASSIFICATION INDEX S1

FIG. 3A

| CLASSIFICATION INDEX S2 | TARGET COMPRESSION RATE | | |
|---|---|---|---|
| | 4 bpp | 2 bpp | 1 bpp |
| $0 \leq S2 < 0.9$ | 4:4:4 | 4:4:4 | 4:2:0 |
| $0.9 \leq S2 \leq 1$ | 4:4:4 | 4:2:0 | 4:2:0 |

CLASSIFICATION INDEX S2

FIG. 3B

| CLASSIFICATION INDEX S3 | TARGET COMPRESSION RATE | | |
|---|---|---|---|
| | 4 bpp | 2 bpp | 1 bpp |
| $0 \leq S3 < 2.2$ | 4:4:4 | 4:4:4 | 4:2:0 |
| $2.2 \leq S3$ | 4:4:4 | 4:2:0 | 4:2:0 |

CLASSIFICATION INDEX S3

FIG. 3C

JPEG 2000

| CLASSIFICATION INDEX S1 | TARGET COMPRESSION RATE | | | |
|---|---|---|---|---|
| | 4 bpp | 2 bpp | 1 bpp | 0.5 bpp |
| 0 ≦ S1 < 0.7 | 4:4:4 | 4:4:4 | 4:4:4 | 4:2:0 |
| 0.7 ≦ S1 ≦ 1 | 4:4:4 | 4:2:0 | 4:2:0 | 4:2:0 |

CLASSIFICATION INDEX S1

*FIG. 4A*

| CLASSIFICATION INDEX S2 | TARGET COMPRESSION RATE | | | |
|---|---|---|---|---|
| | 4 bpp | 2 bpp | 1 bpp | 0.5 bpp |
| 0 ≦ S2 < 0.9 | 4:4:4 | 4:4:4 | 4:4:4 | 4:2:0 |
| 0.9 ≦ S2 ≦ 1 | 4:4:4 | 4:2:0 | 4:2:0 | 4:2:0 |

CLASSIFICATION INDEX S2

*FIG. 4B*

| CLASSIFICATION INDEX S3 | TARGET COMPRESSION RATE | | | |
|---|---|---|---|---|
| | 4 bpp | 2 bpp | 1 bpp | 0.5 bpp |
| 0 ≦ S3 < 2.2 | 4:4:4 | 4:4:4 | 4:4:4 | 4:2:0 |
| 2.2 ≦ S3 | 4:4:4 | 4:2:0 | 4:2:0 | 4:2:0 |

CLASSIFICATION INDEX S3

*FIG. 4C*

IMAGE COMPRESSION APPARATUS AND IMAGE COMPRESSION PROGRAM

This application claims the benefit of Japanese Patent Application No.2001-143675, filed in Japan on May 14, 2001, which is hereby incorporated by reference.

BACKGROUND OF THE INVENTION

1. Field of the Invention

The present invention relates to an image compression apparatus that compresses color image data. The present invention further relates to an image compression program that is used to realize the above-mentioned image compression apparatus in a computer.

2. Discussion of the Related Art

Conventionally, JPEG compression utilizing discrete cosine transformations and JPEG 2000 compression utilizing discrete wavelet transformations, etc., have been well known as standards for the compression of color image data.

In these compression standards, color image data is ordinarily transformed from an RGB color space into a luminance/chrominance color space such as a YCbCr color space. Of these signals, the chrominance signals are commonly subjected to subsampling processing (down-sampling) utilizing the human visual sensitivity characteristic that visual sensitivity with respect to chrominances is generally lower than visual sensitivity with respect to luminance.

FIGS. 8A through 8D are diagrams which show typical formats (4:4:4, 4:2:2, 4:2:0, 4:1:1) for such subsampling processing. Conventionally, in cases where irreversible compression is performed in an image compression apparatus mounted in an electronic camera, etch, the format of the above-mentioned subsampling processing is fixed beforehand. Accordingly, in this type of image compression apparatus, even if the compression parameters such as the target compression rate are altered, there is no alteration of the subsampling rate of the chrominance signals.

Consequently, in the case of an image compression apparatus which is fixed at a coarse subsampling rate, image data that is rich in color variations cannot be adequately handled, which tends to cause problems such as a severe deterioration of color boundary information resulting in conspicuous jaggies, and a drop in the image S/N ratio at the time of expansion.

Furthermore, in the case of the 4:4:4 format in which the chrominance component is not subsampled, the amount of code assigned to the chrominance signals is increased, so that the amount of code assigned to the luminance signal is correspondingly decreased. As a result, in the case of high compression, the amount of code assigned to the chrominance signals overwhelms the amount of code assigned to the luminance signal, so that encoding distortion of the luminance signal tends to occur. For example, in the case of JPEG compression, the problem of block noise generation in the image occurs as a result of such encoding distortion.

SUMMARY OF THE INVENTION

Accordingly, the present invention is directed to image compression apparatus and program that substantially obviate one or more of the problems due to limitations and disadvantages of the related art.

An object of the present invention is to improve the quality of compressed images by appropriately varying the subsampling rate of the chrominance component.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides, in its first aspect, an image compression apparatus for compressing image data that has a plurality of color component signals, including an image judgement part that judges characterizing features of the image data, a subsampling rate setting part that sets the subsampling rate of at least one of the color component signals in accordance with the judged characterizing features, a subsampling processing part that performs subsampling processing of the image data at the set subsampling rate, and a compression encoding part which subjects the subsampling-processed image data to compression encoding.

In a second aspect, the image compression apparatus includes the features of the first aspect, and additionally includes the features that the image data has luminance signal and chrominance signals, the image judgement part judges the characterizing features on the basis of the luminance signal and/or chrominance signals, and the subsampling rate setting part sets the subsampling rate of the chrominance signals in accordance with the judged characterizing features.

In a third aspect, the image compression apparatus includes the features of the second aspect and additionally includes the features that the image judgement part judges the characterizing features from the proportion of the information in the image data that is accounted for by the chrominance signals, and the subsampling rate setting part sets the subsampling rate of the chrominance signals at a coarse value in cases where it is judged by the image judgement part that this proportion of the information is small, and sets the subsampling rate of the chrominance signals at a fine value in cases where it is judged by the image judgement part that this proportion of the information is large.

In a fourth aspect, the image compression apparatus includes the features of the second or third aspect, and further includes a compression rate setting part that sets the target compression rate of the image data, wherein the subsampling rate setting part sets the subsampling rate of the chrominance signals in accordance with the combined conditions of the characterizing features and the target compression rate.

In a fifth aspect, the present invention provides an image compression apparatus for compressing image data that has a plurality of color component signals, including a compression rate setting part that sets a target compression rate of the image data, a subsampling rate setting part that sets the subsampling rate of at least one of the color component signals in accordance with the target compression rate, a subsampling processing part that performs subsampling processing of the image data at the subsampling rate, and a compression encoding part which subjects the subsampling-processed image data to compression encoding in accordance with the target compression rate.

In a sixth aspect, the present invention provides an image compression apparatus for compressing image data that has a plurality of color component signals, including a distortion amount setting part that sets a target distortion amount of the image data, a subsampling rate setting part that sets the subsampling rate of at least one of the color component signals in accordance with the target distortion amount, a subsampling processing part that performs subsampling processing of the image data at the subsampling rate, and a compression encoding part which subjects the subsampling-processed image data to compression encoding in accordance with the target distortion amount. In particular, this compression encoding part is equipped with an image transformation part which subjects the image data to sub-band decomposition into frequency regions, and produces transformation coefficients, a quantizing part that quantizes the transformation coefficients, and an encoding part that encodes the quantized transformation coefficients.

In a seventh aspect, the image compression apparatus includes the features of the first, fifth, or sixth aspect, and additionally includes the features that the image data has luminance signal and chrominance signals, and the subsampling rate setting part sets the subsampling rate of the chrominance signals.

In an eighth aspect, the image compression apparatus includes the features of the sixth aspect, and additionally includes the features that the compression encoding part optimizes the quantization width so that the encoding rate following quantization is minimized, under the following constraining condition that the amount of code distortion generated in the quantization process of the compression encoding adopt a value that corresponds to the target distortion amount.

In a ninth aspect, the image compression apparatus includes the features of any one of the first to eighth aspects, and additionally includes the features that the compression encoding performed by the compression encoding part is compression encoding that is performed in units of tile images obtained by splitting the image data in the image space, the subsampling rate setting part sets the subsampling rate separately for each of the tile images, and the subsampling processing part subsamples the tile images at the subsampling rate set for each of the tile images.

In a tenth aspect, the image compression program includes a program code which is used to cause a computer to function as the image compression apparatus having the features of any one of the first to ninth aspects.

In another aspect, the present invention provides an article of manufacture including a recording medium configured to be readable by a computer; and software codes stored in the recording medium that can be read and interpreted by the computer so as to cause the computer to function as the image compression apparatus of any one of the first to tenth aspects.

In another aspect, the present invention provides an article of manufacture including a recording medium configured to be readable by a computer; and software codes stored in the recording medium that can be read and interpreted by the computer so as to cause the computer to function as the image compression apparatus of any one of the first to tenth aspects, wherein the compression encoding performed by the compression encoding part of the image compressing device is compression encoding that is performed in units of tile images obtained by splitting the image data in the image space, wherein the subsampling rate setting part sets the subsampling rate separately for each of the tile images, and wherein the subsampling processing part subsamples the tile images at the subsampling rate set for each of the tile images.

In another aspect, the present invention provides a method for compressing image data that has a plurality of color component signals, including judging characterizing features of the image data; setting a subsampling rate of at least one of the color component signals in accordance with the characterizing features; performing subsampling processing of the image data at the subsampling rate; and subjecting the subsampling-processed image data to compression encoding.

In another aspect the present invention provides a method for compressing image data that has a plurality of color component signals, including setting a target compression rate of the image data; setting a subsampling rate of at least one of the color component signals in accordance with the target compression rate; performing subsampling processing of the image data at the subsampling rate; and subjecting the subsampling-processed image data to compression encoding in accordance with the target compression rate.

In a further aspect, the present invention provides a method for compressing image data that has a plurality of color component signals, including setting a target distortion amount of the image data; setting a subsampling rate of at least one of the color component signals in accordance with the target distortion amount; performing subsampling processing of the image data at the subsampling rate; and subjecting the subsampling-processed image data to compression encoding in accordance with the target distortion amount the compression encoding including subjecting the image data to sub-band decomposition into frequency regions and producing transformation coefficients, quantizing the transformation coefficients, and encoding the quantized transformation coefficients.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a diagram which shows examples of subsampling rate setting tables;

FIG. 4 is a diagram which shows examples of subsampling rate setting tables;

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 1:
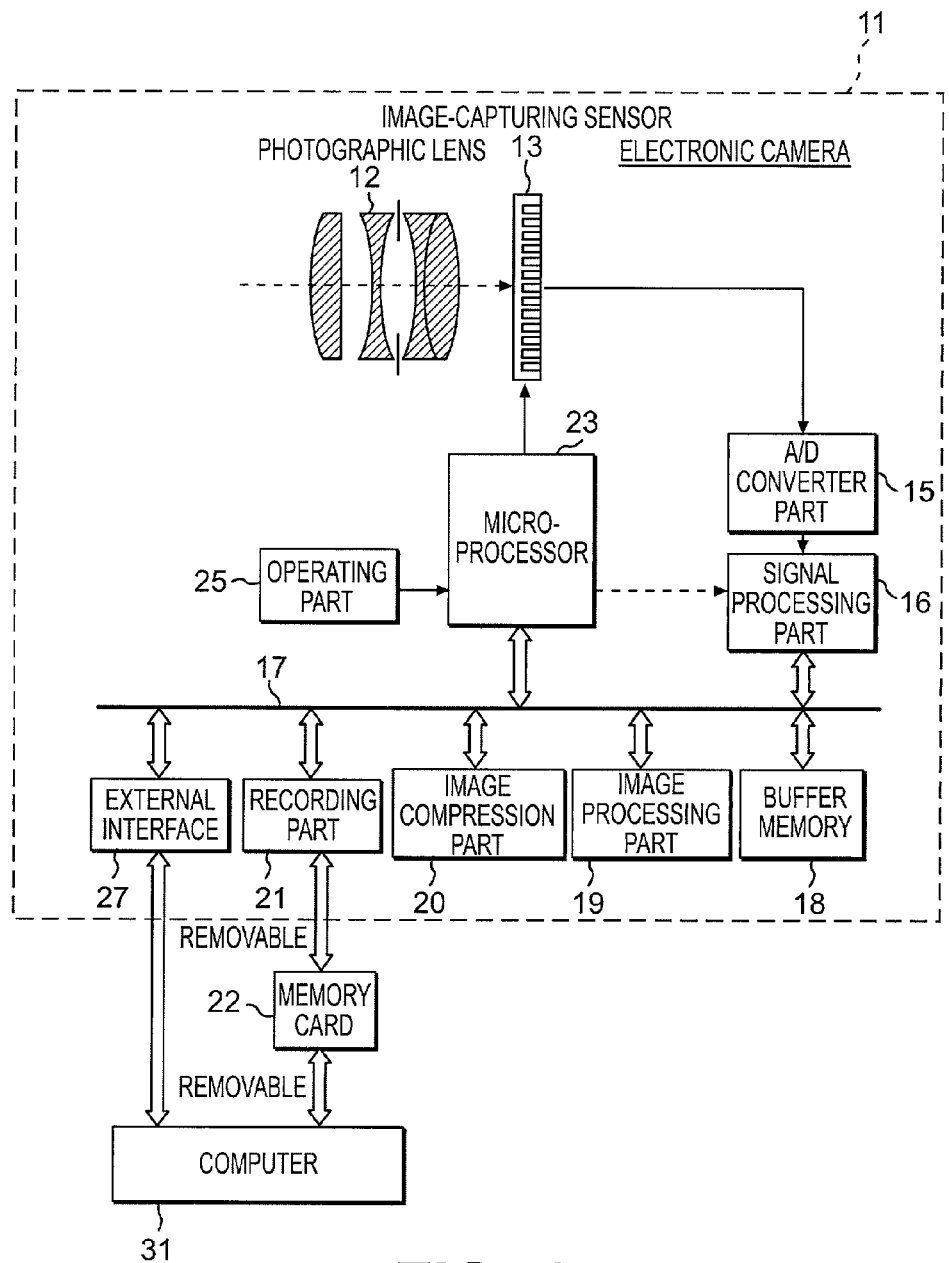
FIG. 1 is a diagram which illustrates the construction of an electronic camera 11 according to a first embodiment of the present invention.

FIG. 1 is a diagram which shows the construction of an electronic camera 11 according to a first embodiment of the present embodiment. As is shown in FIG. 1, a photographic lens 12 is mounted in the electronic camera 11. An image-capturing sensor 13 is disposed at the image space of the photographic lens 12. The image data produced in this image-capturing sensor 13 is digitized via an A/D converter part 15, and is sent to a signal processing part 16. The signal processing part 16 performs signal processing such as black level correction and gamma correction on this image data. The image data that has been subjected to signal processing is temporarily stored in a buffer memory 18 via a bus 17.

An image processing part 19, an image compression part 20 and a recording part 21, etc., are connected to this bus 17. This image processing part 19 performs image processing (color interpolation and color coordinate transformation, etc.) on the image data in the buffer memory 18. The image compression part 20 subjects the image data that has thus been image-processed to compression encoding, thereby producing a compressed file. The recording part 21 records the resultant compressed file on a memory card 22.

In addition, a microprocessor 23 used for system control, an external interface 27 used for data communications with an external computer 31, and an operating part 25 used to perform mode setting and release operations, etc., are installed in the electronic camera 11. The compressed file is opened (expanded) by means of a computer, etc., and is output or displayed as a color image by means of a display or printer, etc.

Various terminologies appeared throughout the instant application have the following exemplary meanings with respect to the present embodiment. An image compression apparatus may be constructed of the image compression part 20 and microprocessor 23. An image judgement part may be constructed of the portion of the microprocessor 23 that determines classification indices by comparing the amounts of information of the chrominance signals/luminance signal. Furthermore, a subsampling rate setting part may be constructed of the portion of the microprocessor 23 that sets the subsampling rate of the chrominance signals in accordance with the combined conditions of the classification indices and the target compression rate. A subsampling processing part may be constructed of the portion of the image compression part 20 that performs subsampling processing of the image data in accordance with the selected chrominance signal subsampling rate. A compression encoding part may be constructed of the portion of the image compression part 20 that performs JPEG or JPEG 2000 compression encoding. A compression rate setting part may be constructed of the portion of the microprocessor 23 that sets the target compression rate in response to an operation performed by the user.

Figure 2:
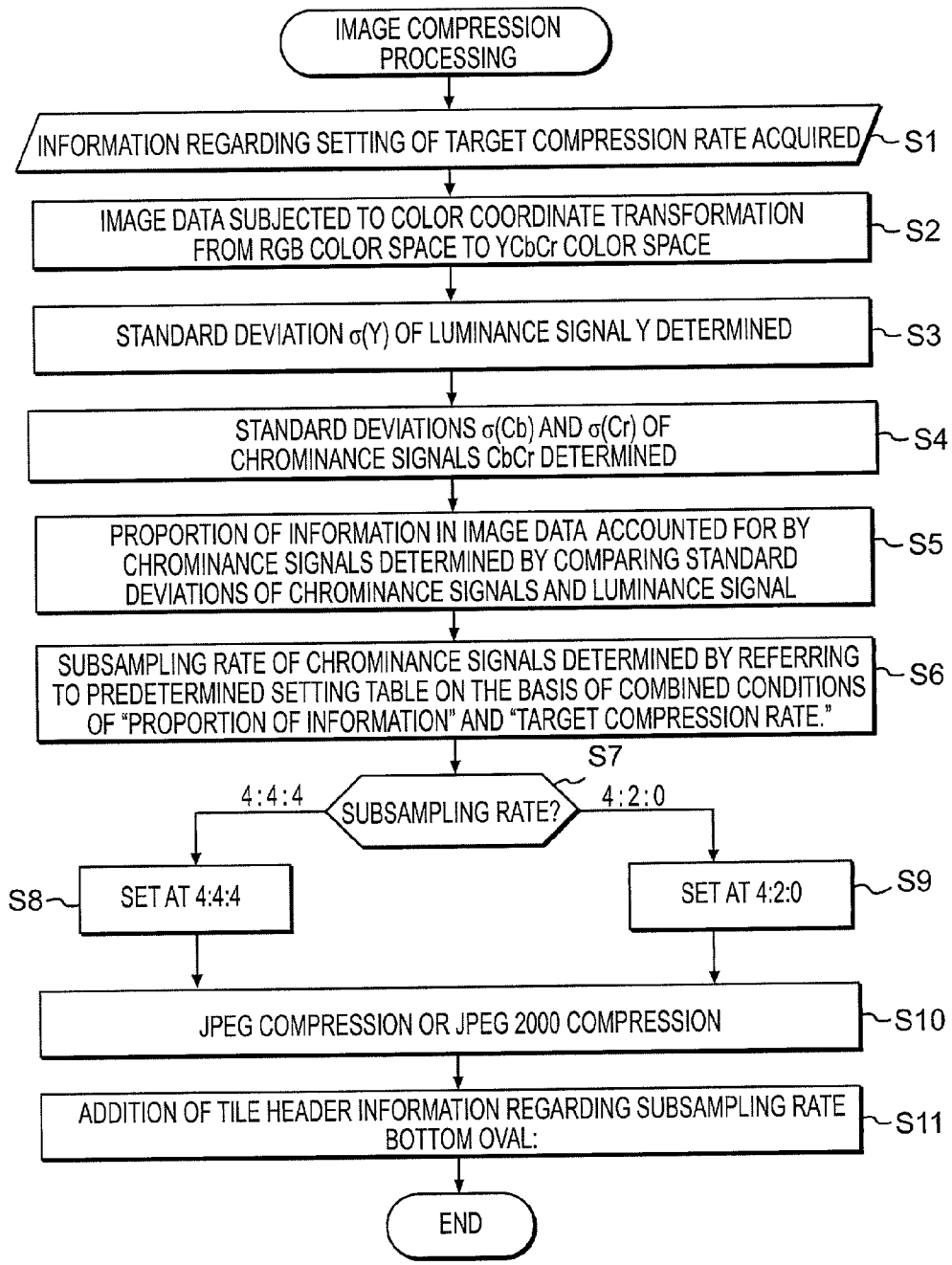
FIG. 2 is a flow chart which illustrates the operation of the image compression processing according to the first embodiment.

FIG. 2 is a flow chart which illustrates the operation of the image compression processing according to the first embodiment, In step S1, the microprocessor 23 acquires information from an internal memory concerning the target compression rate preset by the user, In step S2, the microprocessor 23 instructs the image processing part 19 regarding color coordinate transformation of the image data. The image processing part 19 subjects the image data in the buffer memory 18 to a color coordinate transformation from an RGB color space to a YCbCr color space.

In stop S3, the microprocessor 23 successively reads out luminance signal Y from the buffer memory 18, and determines the standard deviation σ(Y) of the luminance signal Y in accordance with the following equations:

$$<Y> = \frac{1}{N_x N_y} \sum_{i=1}^{N_x} \sum_{j=1}^{N_y} Y[i,j], \quad (1)$$

$$\sigma(Y) = \sqrt{\frac{1}{N_x N_y} \sum_{i=1}^{N_x} \sum_{j=1}^{N_y} (Y[i,j] - <Y>)^2}. \quad (2)$$

In the above equations, Y[i,j] indicates the luminance signal value (8 bit gradation) at the pixel position [i,j], Nx is the number of horizontal pixels in the image data, and Ny is the number of vertical pixels in the image data.

In step S4, the microprocessor 23 successively reads out chrominance signals CbCr from the buffer memory, and determines the standard deviations σ(Cb) and σ(Cr) of the chrominance signals CbCr in accordance with the following equations:

$$<Cb> = \frac{1}{N_x N_y} \sum_{i=1}^{N_x} \sum_{j=1}^{N_y} Cb[i,j], \quad (3)$$

$$\sigma(Cb) = \sqrt{\frac{1}{N_x N_y} \sum_{i=1}^{N_x} \sum_{j=1}^{N_y} (Cb[i,j] - <Cb>)^2}, \quad (4)$$

$$<Cr> = \frac{1}{N_x N_y} \sum_{i=1}^{N_x} \sum_{j=1}^{N_y} Cr[i,j], \quad (5)$$

$$\sigma(Cr) = \sqrt{\frac{1}{N_x N_y} \sum_{i=1}^{N_x} \sum_{j=1}^{N_y} (Cr[i,j] - <Cr>)^2}. \quad (6)$$

In the above equations, Cb[i,j] and Cr[i,j] are the chrominance signal values (8 bit gradation) at the pixel position [i,j].

In step S5, the microprocessor 23 compares the standard deviations σ(Cb) and σ(Cr) of the chrominance signals and the standard deviation σ(Y) of the luminance, and determines the proportion of the information contained in the image data that is accounted for by the chrominance signals. More specifically, the determination is made by calculating one of the following classification indices S1 through S3:

$$\text{Classification Index } S1 = \frac{\sigma(Y)}{\sigma(Y) + \sigma(Cb) + \sigma(Cr)}, \quad (7)$$

$$\text{Classification Index } S2 = \frac{\sigma(Y)^2}{\sigma(Y)^2 + \sigma(Cb)^2 + \sigma(Cr)^2}, \quad (8)$$

$$\text{Classification Index } S3 = \frac{\sigma(Y)}{\sigma(Cb) + \sigma(Cr)}. \quad (9)$$

In the case of these classification indices S1 through S3, a smaller value indicates a greater proportion of the information contained in the image data that is accounted for by the chrominance signals.

Furthermore, in calculating the classification indices S1 through S3, the standard deviation σ may be replaced by the dispersion or the sum σ* of the absolute values of the differences indicated by the following equation:

$$\sigma^*(X) = \frac{1}{N_x N_y} \sum_{i=1}^{N_x} \sum_{j=1}^{N_y} \left| X[i,j] - \langle X \rangle \right|. \quad (10)$$

(where $X = Y, Cb, Cr$)

In step S6, the microprocessor 23 refers to a setting table and determines the subsampling rate of the chrominance signals on the basis of the combined conditions of the proportion of the information (classification index) determined in step S5 and the target compression rate acquired as information in step S1. FIGS. 3A through 3C show examples of setting tables used in the case of JPEG compression, while FIG. 4A through 4C show examples of setting tables used in the case of JPEG 2000 compression.

Here, in the case of a target compression rate at which the encoding distortion of the luminance signal is large (e.g., 1 bpp in the case of JPEG, or 0.5 bpp in the case of JPEG 2000), the subsampling rate is set at a coarse subsampling rate such as 4:2:0. As a result, the encoding distortion of the luminance signal can be alleviated. Meanwhile, in the case of a target compression rate at which the encoding distortion of the luminance signal is small (e.g., 4 bpp in the case of JPEG, or 4 bpp in the case of JPEG 2000), the subsampling rate is set at a fine subsampling rate such as 4:4:4. As a result, the reproducibility of color boundaries can be appropriately increased without inducing encoding distortion of the luminance signal.

Furthermore, in the case of a target compression rate at which the encoding distortion of the luminance signal is moderate (e.g., 2 bpp in the case of JPEG, or 1 to 2 bpp in the case of JPEG 2000), the subsampling rate is set on the basis of the classification index. Specifically, in cases where the classification index is less than a certain threshold value, the microprocessor 23 judges the image data to be data that is rich in color variation, and sets the subsampling rate at a fine rate such as 4:4:4. Conversely, in cases where the classification index exceeds this threshold value, the microprocessor 23 judges the image data to be data that has little color variation, and sets the subsampling rate at a coarse rate such as 4.2:0.

In step S7, if the subsampling rate determined in step S6 is "4:4:4," the microprocessor 23 advances the operation to step 38. On the other hand, if the subsampling rate is "4:2:0," the microprocessor 23 advances the operation to step S9. In step S8, the microprocessor 23 performs processing setting of a subsampling format of "4:4:4" for the image compression part 20. Following this processing, the microprocessor 23 advances the operation to step S10. In step S9, the microprocessor 23 performs processing setting of a subsampling format of "4:2:0" for the image compression part 20. In accordance with this processing setting, the image compression part 20 performs chrominance subsampling of "4:2:0" on the image data in the buffer memory 18.

In step S10, the image compression part 20 performs compression processing according to JPEG or JPEG 2000, for example, on the image data in the buffer memory 18, and thus produces a compressed file with the target compression rate. In step S11, the image compression part 20 adds header information relating to the subsampling rate to the compressed file. This completes image compression processing of this example.

In the first embodiment the proportion of the information contained in the image data that is accounted for by the chrominance signals is judged on the basis of a comparison of the amounts of information of the luminance signal/chrominance signals (here, a comparison of the standard deviations). In this case, if it is judged that the proportion of the information accounted for by the chrominance signals is relatively large, the subsampling rate for the chrominance signals is set at the 4:4:4 format. Accordingly, in the case of image data with a relatively rich color variation, problems such as drop-out and jaggies that accompany chrominance subsampling can be avoided.

On the other hand, if it is judged that the proportion of chrominance information in the overall image information is relatively small, the subsampling rate for the chrominance signals is set at the 4:2:0 format. Accordingly, in the case of image data with relatively little color variation, the number of pixels in the chrominance signals is appropriately reduced, so that the assignment of code to the luminance signal can be correspondingly increased. As a result, distortion of the luminance signal can be appropriately reduced, so that block noise in JPEG compression, etc., can be ameliorated.

Furthermore, in the first embodiment, a coarser subsampling rate is selected as the subsampling rate for the chrominance signals when the target compression rate is set at a higher compression. Accordingly, an increase in the encoding distortion of the luminance signal can be predicted from the target compression rate, and the subsampling rate of the chrominance signals can be altered to a coarse subsampling rate. In this case, the encoding distortion of the luminance signal can be ameliorated, so that the overall compressed image quality can be improved.

Second Embodiment

Figure 5:
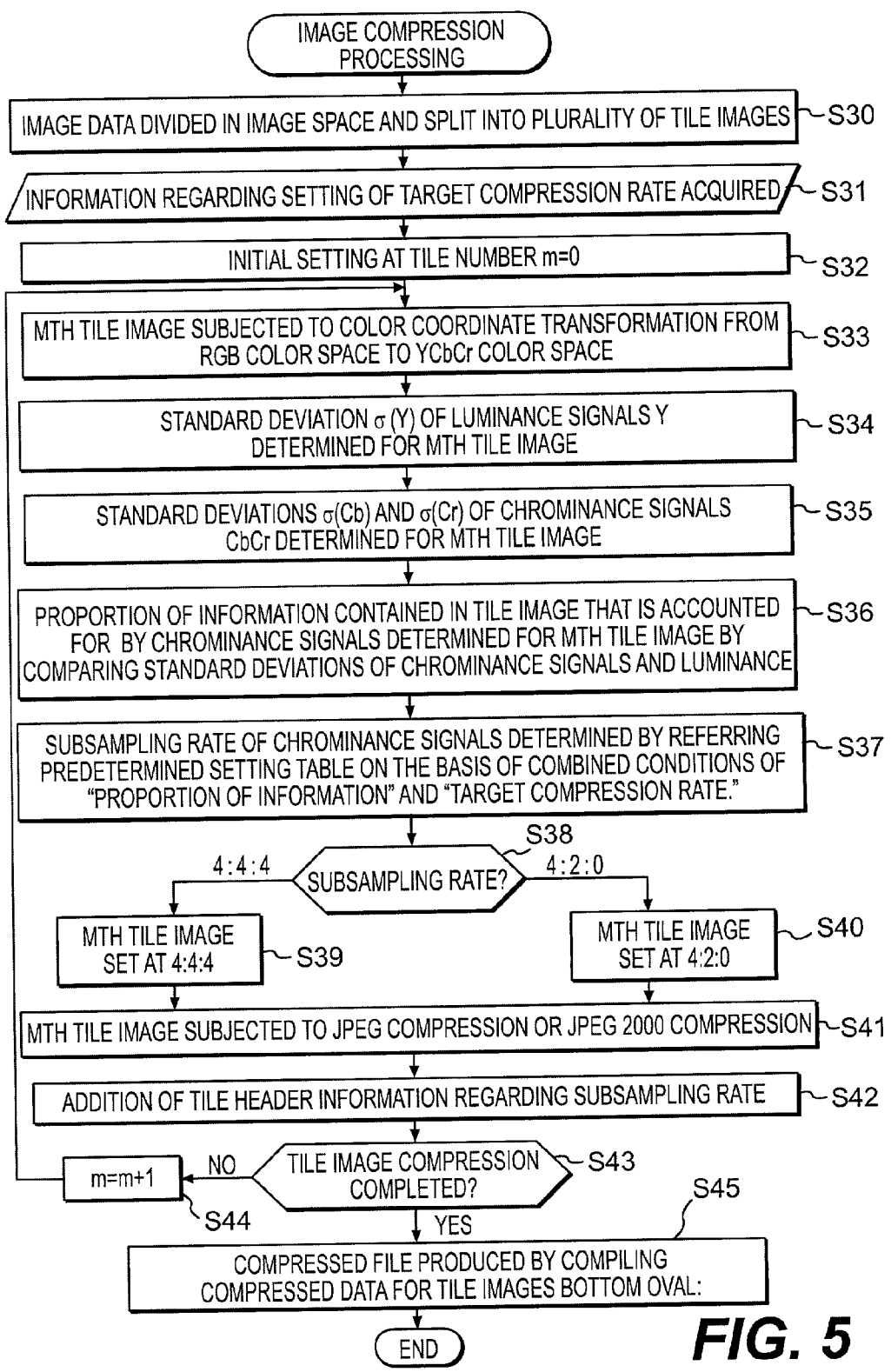
FIG. 5 is a flow chart which illustrates the operation of the image compression processing in the second embodiment.

FIG. 5 is a flow chart which illustrates the operation of image compression processing according to a second embodiment. This image compression processing may be implemented in an apparatus similar to the first embodiment above—i.e., the apparatus depicted in FIG. 1, for example. One of the characteristic features of this embodiment is that the subsampling rate is set for individual tile images. Portions of this embodiment that correspond to this characteristic features will be described in detail below. The other parts are constructed in a manner similar to those of the first embodiment.

(1) The microprocessor 23 divides the image data in the image space and splits the image data into a plurality of tile images (step S30).

(2) For each of the individual tile images, the microprocessor 23 determines the proportion of the information contained in the tile image that is accounted for by the chrominance signals (steps S34 through S36).

(3) For each of the individual tile images, the microprocessor 23 varies the subsampling rate in accordance with the combined conditions of the proportion of information and target compression rate (step S37).

(4) The image compression part 20 subjects the individual tile images to subsampling processing at the respective subsampling rates (steps S39 through S40).

Figure 6:
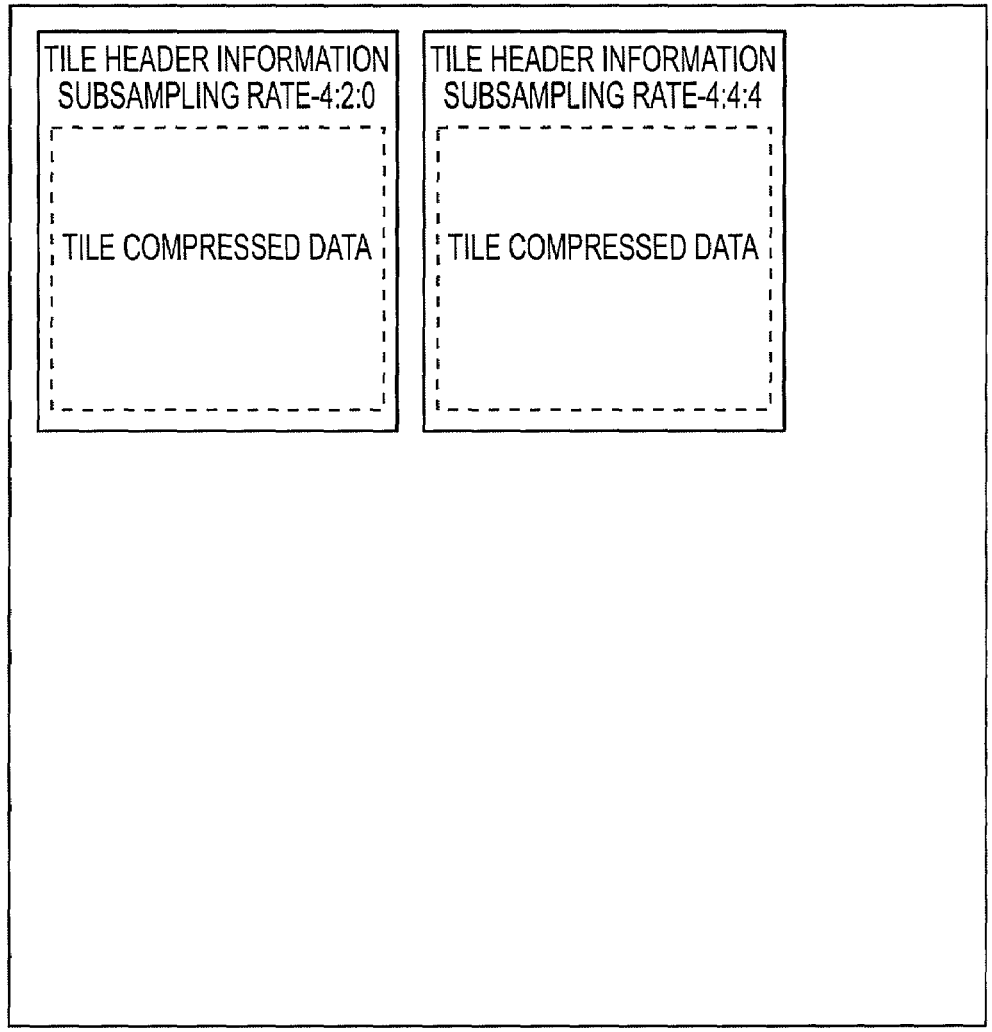
FIG. 6 is a diagram which illustrates the compressed data structure.

(5) The image compression part 20 adds tile image subsampling rate information to the individual tile headers as shown in FIG. 6 (step S42).

Effects similar to those of the first embodiment can be obtained by the processing including these features. In addition, in the second embodiment, the subsampling rate of the chrominance signals can be finely adjusted and set in accordance with local special characteristics of the individual tile images. Accordingly, the subsampling rate can be finely adjusted and altered in tile units in accordance with image patterns in the frame.

Third Embodiment

Figure 7:
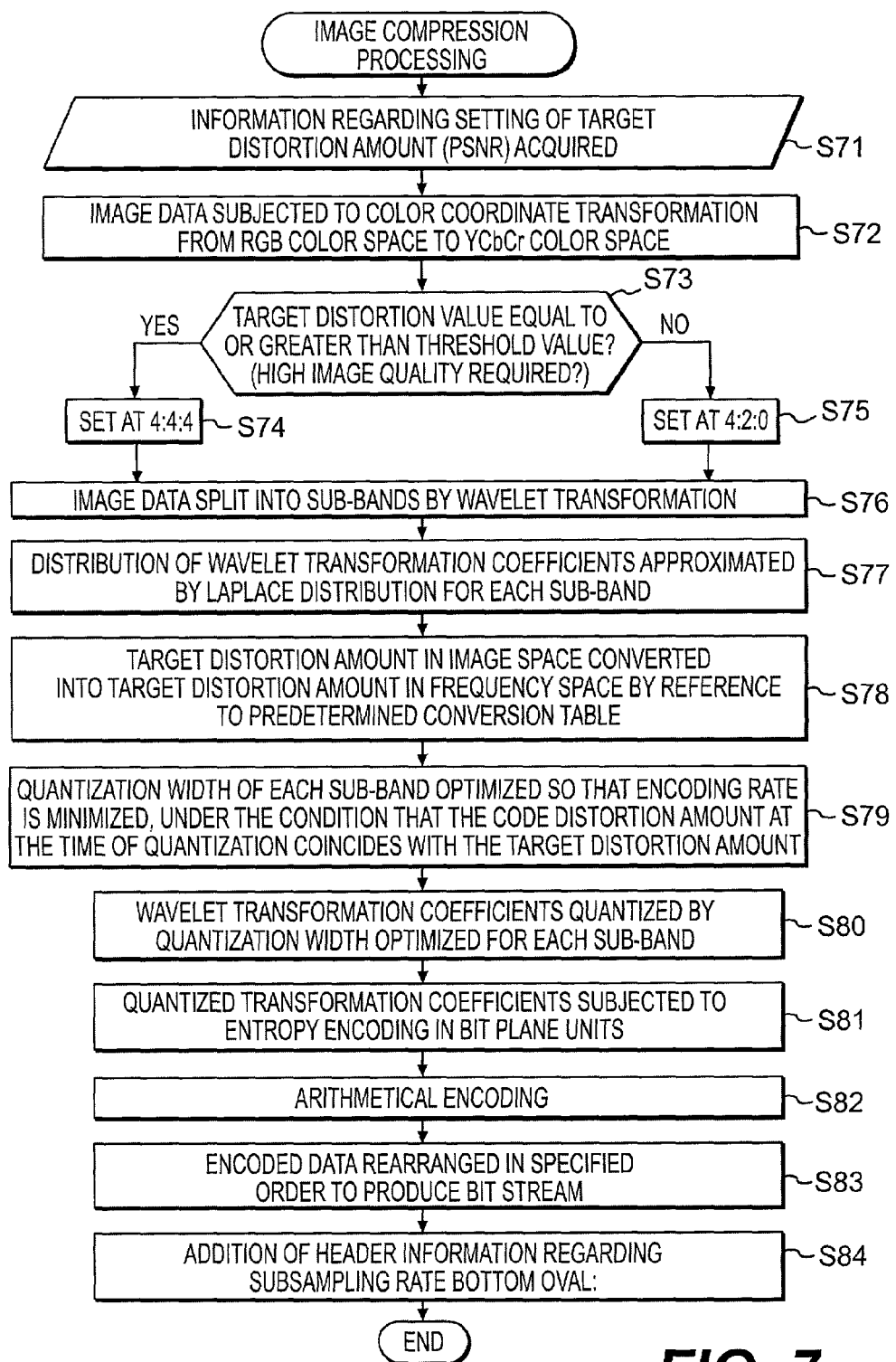
FIG. 7 is a flow chart which illustrates the operation of the image compression processing in the third embodiment.
Figure 8A:
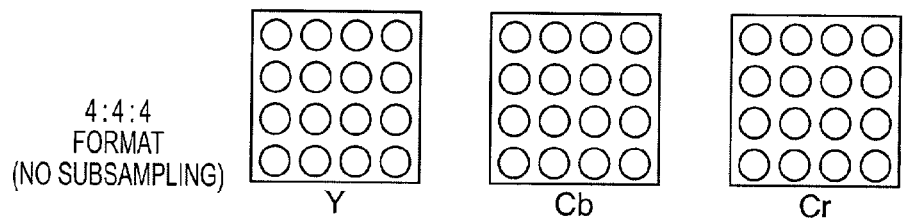
FIG. 8 is a diagram which shows examples of subsampling rate formats.
Figure 8B:
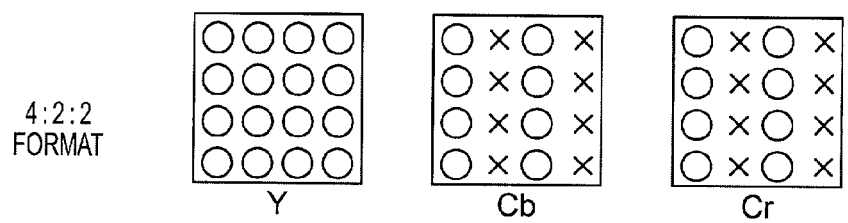
Figure 8C:
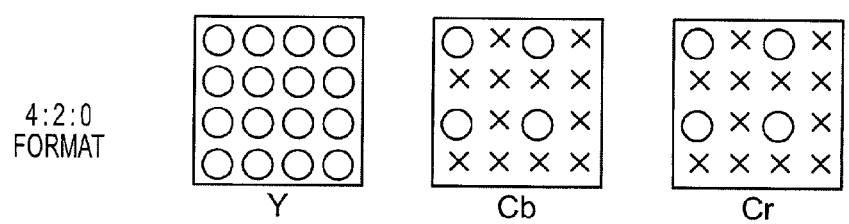
Figure 8D:
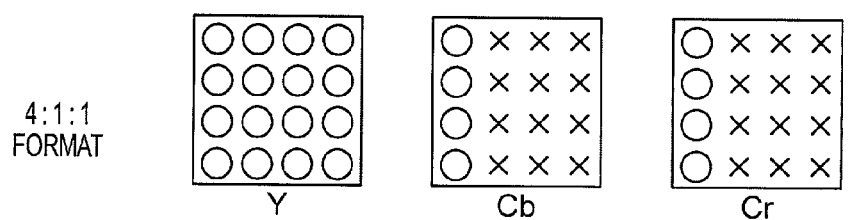

FIG. 7 is a flow chart which illustrates the operation of the image compression processing according to a third embodiment of the present invention. In step S71, the microprocessor 23 acquires information concerning a target distortion amount preset by the user from an internal memory. This target distortion amount is given in terms of the dB value of the PSNR (peak signal to noise ratio). In step S72, the microprocessor 23 instructs the image processing part 19 to perform a color coordinate transformation of the image data. The image processing part 19 subjects the image data in the buffer memory 18 to a color coordinate transformation from an RGB color space to a YCbCr color space.

In step S73, the microprocessor 23 performs a threshold value judgement on the target distortion amount. In this case, if the target distortion amount is equal to or greater than the threshold value (e.g., corresponding to PSNR=32 dB), the microprocessor 23 judges that high image quality compression processing is required, and advances the operation to step S74. On the other hand, if the target distortion amount is less than the threshold value (e.g., corresponding to PSNR=32 dB), the microprocessor 23 judges that ordinary image quality compression processing is required, and advances the operation to step S75.

In step S74, the microprocessor 23 performs processing setting of a subsampling format of "4:4:4" for the image compression part 20. Following this processing, the microprocessor 23 advances the operation to step S76. In stop S75, the microprocessor 23 performs processing setting of a subsampling format of "4:2:0" for the image compression part 20. In accordance with this processing setting, the image compression part 20 performs chrominance subsampling of "4:2:0" on the image data in the buffer memory 18.

In step S76, the image compression part 20 recursively performs discrete wavelet transformations for the image data in the buffer memory 18, and thus splits the image data into a plurality of sub-bands. In step S77, for each sub-band, the image compression part 20 prepares a frequency distribution of the transformation coefficients x, and approximates the probability density function of this distribution using the following Laplace distribution equation:

$$f(x) = \frac{\alpha}{2} e^{-\alpha|x|}. \tag{11}$$

In step S78, the image compression part 20 acquires information regarding the target distortion amount from the microprocessor 23. Since this target distortion amount is a distortion amount that uses pixel values as a reference, the image compression part 20 refers to a specified conversion table and performs a conversion into a target distortion amount $D_o$ in the frequency space. Furthermore, this conversion table is a data table in which distortion amounts using a pixel value as a reference and distortion amounts using transformation coefficients as a reference are associated to each other based on measured values, etc.

In step S79, under the condition that the encoding distortion amount at the time of quantization is constrained to the target distortion amount, the image compression part 20 optimizes the quantization width for each sub-band so that the encoding rate is minimized.

This optimization problem will be described in principle as follows. If the transformation coefficients x are uniformly quantized using a quantization step width of $\Delta$, then the probability $P_k$ that a given transformation coefficient will assume the kth quantized value following quantization is expressed as follows:

$$P_k = \int_{\Delta(k-1/2)}^{\Delta(k+1/2)} f(x)dx. \tag{12}$$

The encoding rate $R(\Delta)$ of the transformation coefficients based on this quantization is ideally equal to the entropy, and is given by the following equation:

$$R(\Delta) = \tag{13}$$
$$-\sum_k P_k \log P_k = -\log(1 - e^{-\alpha\Delta/2}) + e^{-\alpha\Delta/2}\log\frac{2}{1+e^{\alpha\Delta/2}} + \frac{\alpha\Delta}{2\sinh\frac{\alpha\Delta}{2}}.$$

Furthermore, the distortion amount $D(\Delta)$ of the transformation coefficients caused by this quantization can be expressed by the following equation that evaluates the squared error:

$$D(\Delta) = \sum_k \int_{\Delta(k-1/2)}^{\Delta(k+1/2)} (x-k\Delta)^2 f(x)dx = \frac{2}{\alpha^2} + \frac{\Delta}{\alpha}e^{\alpha\Delta/2} + \frac{2\Delta\cosh\frac{\alpha\Delta}{2}}{\alpha(1-e^{-\alpha\Delta})}. \tag{14}$$

In order to solve the above-identified optimization problem, a Lagrangian (undetermined) multiplier $\lambda$ is introduced, so that a function J is defined as follows:

$$J = \sum_i R_i(\Delta_i) + \lambda\left(\sum_i D_i(\Delta_i) - D_o\right). \tag{15}$$

Furthermore, in the above equation, sequence numbers, i=1, 2 . . . NA, are assigned to the individual sub-bands without distinguishing YCbCr. When this function J is subjected to a partial differentiation by the distortion amount $D_i$ of the sub-band i so that the optimal conditions are determined, the following equation is obtained:

$$\frac{\partial J}{\partial D_i} = \frac{dR_i}{dD_i} + \lambda = 0. \tag{16}$$

Equation (16) is transformed into:

$$\lambda = -\frac{dR_i}{dD_i} = -\frac{dR_i}{d\Delta_i} \bigg/ \frac{dD_i}{d\Delta_i}. \tag{17}$$

The right side of Equation (17) is expressed as a function of the quantization step width $\Delta_i$ alone. Accordingly, by determining the inverse function of Equation (17), it is possible to express the quantization step width $\Delta_i$ as a function of the undetermined multiplier $\lambda$:

$$\Delta_i = \Delta_i(\lambda), \text{ where } i=1, 2 \ldots NA. \tag{18}$$

The distortion amount $D_i$ of the sub-band i can be expressed as a function of the undetermined multiplier $\lambda$ by respectively substituting these equations into the following Equation (14):

$$D_i = D_i(\lambda), \text{ where } i=1, 2 \ldots NA. \tag{19}$$

Then, the following evaluating calculation is performed after an appropriate $\lambda$ is set so that $D_i(\lambda)$ is determined:

$$D_\lambda = \sum_i D_i(\lambda). \tag{20}$$

The adjustment of $\lambda$ is repeated until this overall sum $D_\lambda$ of the distortion amounts substantially coincides with the target distortion amount $D_o$ determined in step S78. Following this repetition, the quantization step width $\Delta_i$ (=1, 2 ... NA) for each sub-band is determined by substituting the established $\lambda$ into the above-mentioned equation of $\Delta_i$.

In step S80, the image compression part 20 performs quantization of the transformation coefficients in accordance with the quantization step width optimized for each sub-band. In step S81, the image compression part 20 subjects the quantized transformation coefficients to entropy encoding in bit plane units. In step S82, the image compression part 20 subjects the entropy-encoded data to arithmetical encoding. In step S83: The image compression part 20 rearranges the encoded data into a specified order, and thus produces a bit stream. In step S84, the image compression part 20 adds information regarding the subsampling rate of the chrominance signals to the bit stream as header information, thereby producing a compressed file. This completes the processing of this example.

In the third embodiment, the subsampling rate of the chrominance signals is altered in accordance with the target distortion amount. By such adjustment of the subsampling rate of the chrominance signals using the target distortion amount as a reference material for judgement, it is possible to optimize the information allocation of the luminance signal/chrominance signals during image compression.

Furthermore, in the third embodiment, image compression processing may also be performed for each tile image. In this case, the quantization step width can be optimized by an even finer distinction for each tile image. As a result, the quantization step width can be set individually with consideration of local differences in each tile image, so that more appropriate image compression processing can be realized.

In the first and second embodiments described above, the proportion of the information contained in the image that is accounted for by the chrominance signals is judged as a characterizing feature (characteristic) of the image data. However, characterizing features of the image data are not limited to this. For example, the amount of information in the chrominance signals alone, the amount of information in the luminance signal alone, the space frequency distribution or a histogram of the pixel values, etc., may also be used as the characterizing features of the image data.

Furthermore, besides using characterizing features of the image data, it is also be possible to alter the subsampling rate of the chrominance signals in accordance with the image-capturing conditions of the electronic camera 11. For example, at least one of the following conditions (1) through (15) is usable as such imaging conditions:

(1) Lens stop value;
(2) Focal length of photographic lens 12;
(3) Individual characteristic information regarding the photographic lens 12;
(4) Sensitivity setting of the image-capturing sensor 13;
(5) White balance adjustment value;
(6) Gamma correction value;
(7) Multi-pattern light measurement value;
(8) Device temperature of image-capturing sensor 13;
(9) Exposure time of image-capturing sensor 13;
(10) Presence or absence of strobe use;
(11) Magnification of electronic zoom;
(12) Distance to object of imaging;
(13) Focusing conditions of photographic lens 12;
(14) Multi-point focusing conditions of photographic lens 12; and
(15) Vertical position imaging or horizontal position imaging.

Furthermore, in the above-mentioned embodiments, image processing performed in the electronic camera 11 was described. However, the present invention is not limited to such image processing. For example, the above-mentioned processing operations (e.g., FIG. 2, FIG. 5 or FIG. 7) may be converted into a program code, thus creating an image compression program corresponding to the tenth aspect of the present invention above. The above-mentioned image compression apparatus can be realized by executing this image compression program in a computer.

Furthermore, in the above-mentioned embodiments, cases were described in which processing was performed in accordance with the JPEG or JPEG 2000 compression standards, However, the present invention is not limited to these standards. The present invention can be applied to all image compression in which subsampling processing of the color component signals (especially chrominance signals) is performed.

Furthermore, in regard to the tile images of the present invention, the present invention is not limited to the content stipulated in JPEG 2000. In general, the term "tile images" refers to small images obtained by splitting the image data into a plurality of images in the image space. For example, such tile images are not limited to a rectangular shape, etc.

Furthermore, in the above-mentioned embodiments, subsampling rate setting tables of FIG. 3 are used for illustrative purposes. However, the present invention is not limited to such setting tables. For example, the 4:2:2 format and 4:1:1 format, etc., may be provided as options for the subsampling rate. Especially in the case of high-resolution image data, the pixel blocks that are referred to can be increased in size; accordingly, various other formats can be used besides the subsampling formats shown in FIG. 8.

Furthermore, in the above-mentioned embodiments, the subsampling rate was altered in two stages (i.e., the two options of 4:4:4 or 4:2:0). However, the present invention is not limited to such alteration. The subsampling rate may also be altered using a fine distinction consisting of three or more stages.

Furthermore, in the present invention, there are no particular limitations on the content of the calculations performed in subsampling processing. For example, various other subsampling processing calculations, such as average calculations, median calculations and simple pixel subsampling, may be used.

Furthermore, in the above-mentioned embodiments, compression processing in a YCbCr color space is described. However, the present invention is not limited to such processing. For example, the present invention can also be applied to a GCbCr color space, YUV color space, YIQ color space, G (R-G) (B-G) color space or Lab color space, etc.

Specifically, the term "chrominance signals" used here should be understood to be a generic term for color components that differ from luminance signal (e.g., G component, Y component, L component, etc.) in these various types of color spaces.

Furthermore, in the above-mentioned first and second embodiments, classification indices S1 through S3 using pixel values in the image space as a reference are determined as indices indicating the proportion of the information accounted for by the chrominance signals. However, the present invention is not limited to such indices, For example, the proportion of the information accounted for by the chrominance signals may also be determined in the frequency space.

According to the first aspect of the present invention, the subsampling rate of the image signal is altered on the basis of characterizing features of the image signal. By means of such alteration of the subsampling rate, it is possible to adjust the distribution of information in the compressed file in accordance with characterizing features of the image data, so that the compressed image quality can be improved.

According to the second aspect of the present invention, characterizing features of the image are judged on the basis of the luminance signal and/or chrominance signals, and the subsampling rate of the chrominance signals is altered in accordance with these characterizing features. By means of such alteration of the subsampling rate, it is possible to adjust the distribution of the amounts of information of the luminance signal/chrominance signals in the compressed file in accordance with the image data. As a result, in the present invention, a distribution of information that is suited to the image data can be achieved, so that the compressed image quality can be improved.

According to the third aspect of the present invention, the proportion of the information contained in the image data that is accounted for by the chrominance signals is used as the characterizing feature of the image data.

In cases where this proportion of the information that is accounted for by the chrominance signals is large, the image data is image data that has a relatively rich color variation, and it may be predicted that the deterioration in information caused by chrominance subsampling will be large. Accordingly, by setting the subsampling rate at a fine subsampling rate in accordance with the judgement that this proportion of the information is large, the compressed image quality of image data that is rich in color variation can be appropriately improved.

On the other hand, in cases where the proportion of the information that is accounted for by the chrominance signals is small, the image data is image data that has little color variations and it may be predicted that the deterioration in information caused by chrominance subsampling will be relatively small. Accordingly, by setting the subsampling rate at a coarse subsampling rate in accordance with the judgement that this proportion of the information is small, the number of pixels of the chrominance signals can be appropriately reduced at a level that has no great effect on the image quality. As a result, the assignment of code to the luminance signal can be appropriately increased, so that distortion of the luminance signal can be suppressed. (In particular, a considerable reduction in block noise is achieved in the case of JPEG compression).

According to the fourth aspect of the present invention, the subsampling rate of the chrominance signals is set in accordance with the combined conditions of the characterizing features of the image and the target compression rate. Generally, the amount of compression code that should be preferably distributed between the luminance signal and the chrominance signal throughout the image data as a whole is approximately determined by the target compression rate. Accordingly, the extent of the margin that is available in the information distribution of the image data can be judged on the basis of the target compression rate. Consequently, by using the combined conditions of the characterizing features of the image and target compression rate as judgement reference materials, it is possible to make an accurate prediction of the conditions of information distribution at the time of image compression, so that a much more appropriate subsampling rate can be set.

According to the fifth aspect of the present invention, the subsampling rate of the image signal is altered on the basis of the target compression rate, Generally, the amount of compression code that should be distributed throughout the image data as a whole is approximately determined by the target compression rate. Accordingly, the extent of the margin that is available in the information distribution of the image data can be predicted by means of the target compression rate. Consequently, by altering the subsampling rate in accordance with the target compression rate, it is possible to optimize the distribution of information in the compressed file. As a result, the compressed image quality can be improved.

According to the sixth aspect of the present invention, the subsampling rate of the chrominance signals is set in accordance with the target distortion amount. This target distortion amount indicates the extent to which small-level signals of the image are faithfully compressed and stored. Specifically, this target distortion amount is a measure that influences the compressed image quality from a different angle than the target compression rate, Accordingly, by altering the subsampling rate in linkage with this target distortion amount, it is possible to control the overall compressed image quality more freely. As a result, effective improvement of the overall compressed image quality is facilitated. Furthermore, in the case of such alteration of the subsampling rate, the deterioration in the reproducibility of small-level signals caused by the target distortion amount and the deterioration in color boundary information caused by the subsampling rate can be appropriately balanced. In this case, the reproducibility of small-level signals can be increased without any great increase in the amount of compression code, by sacrificing color boundary information. Alternatively, by sacrificing the reproducibility of small-level signals, it is possible to improve the reproducibility of color boundaries without any significant increase in the amount of compression code.

According to the seventh aspect of the present invention, the subsampling rate of the chrominance signals is adjusted on the basis of at least one of the characterizing features of the image, the target compression rate, and the target distortion amount. By means of such alteration of the subsampling rate of the chrominance signals, it is possible to adjust the distribution of the amount of information of the luminance signal/chrominance signals in the compressed file in accordance with the image data As a result, the compressed image quality can be improved by a distribution of information that is suited to the image data.

According to the ninth aspect of the present invention, the subsampling rate of the chrominance signals is set for individual tile images. Accordingly, the subsampling rate of the chrominance signals can be finely adjusted for the respective tile images, so that the compressed image quality can be further improved.

Moreover, in the image compression apparatuses of the first to fourth aspects, the subsampling rate of the chrominance signals is varied in tile image units in accordance with local characterizing features of the image. Accordingly, operations such as appropriately varying the subsampling rate of the chrominance signals in areas of rich color variation and areas of little color variation within the image can be performed, so that the compressed image quality can be further improved.

By executing the image compression program of the tenth aspect of the present invention with a computer, it is possible to realize the constituent elements of any one of the first to ninth aspects of the present invention in such a computer functioning a virtual machine. As a result, the image compression apparatus of any one of the first to ninth aspects of the present invention can be realized in a computer.

It will be apparent to those skilled in the art that various modifications and variations can be made in the image compression apparatus and program of the present invention without departing from the spirit or scope of the invention. Thus, it is intended that the present invention cover the modifications and variations of this invention provided they come within the scope of the appended claims and their equivalents.

What is claimed is:

1. An image compression apparatus for compressing image data that has a luminance signal and chrominance signals, comprising:
   an image judgement part that judges a proportion of information quantity in the image data that is part of the chrominance signals on the basis of both the luminance signal and the chrominance signals;
   a subsampling rate setting part that sets a subsampling rate of the chrominance signals in accordance with the proportion;
   a subsampling processing part that performs subsampling processing for the chrominance signals in the image data at the subsampling rate;
   a compression encoding part which subjects the subsampling-processed image data to compression encoding; and
   wherein the subsampling setting part sets the subsampling rate of the chrominance signals at a coarse value when it is judged by the image judgement part that the proportion is small and sets the subsampling rate of the chrominance signals at a fine value when it is judged by the image judgement part that the proportion is large.

2. The image compression apparatus according to claim 1, wherein the subsampling rate setting part sets a common subsampling rate over the entire image of the chrominance signals in the image.

3. The image compression apparatus according to claim 1, wherein the subsampling rate setting part sets the subsampling rate of the chrominance signals in accordance with the proportion and the target compression rate.

4. An image compression apparatus for compressing image data that has a luminance signal and chrominance signals, comprising:
   a compression rate setting part that sets a target compression rate of the image data;
   a subsampling rate setting part that sets a common subsampling rate over an entire image of the chrominance signals in accordance with the target compression rate;
   a subsampling processing part that performs subsampling processing only for the chrominance signals in the image data at the subsampling rate;
   a compression encoding part that subjects the subsampling-processed image data to compression encoding in accordance with the target compression rate; and
   wherein the subsampling setting part sets the subsampling rate of the chrominance signals at a coarse value when the target compression rate is high and sets the subsampling rate of the chrominance signals at a fine value when the target compression rate is low.

5. The image compression apparatus according to claim 1, wherein the compression encoding performed by the compression encoding part is compression encoding that is performed in units of tile images obtained by splitting the image data in the image space;
   wherein the subsampling rate setting part sets the subsampling rate separately for each of the tile images, and
   wherein the subsampling processing part subsamples chrominance signals in the tile images at the subsampling rate set for each of the tile images.

6. An article of manufacture comprising:
   a recording medium configured to be readable by a computer;
   software codes stored in the recording medium that can be read and interpreted by the computer so as to cause the computer to function as the image compression apparatus of claim 1.

7. An article of manufacture comprising:
   a recording medium configured to be readable by a computer;
   software codes stored in the recording medium that can be read and interpreted by the computer so as to cause the computer to function as the image compression apparatus of claim 4.

8. A method for compressing image data that has a luminance signal and chrominance signals, comprising:
   judging a proportion of information quantity in the image data that is part of the chrominance signals, on the basis of both the luminance signal and the chrominance signals;
   setting a subsampling rate of the chrominance signals in accordance with the proportion;
   performing subsampling processing for the chrominance signals in the image data at the subsampling rate;
   subjecting the subsampling-processed image data to compression encoding; and
   setting the subsampling rate of the chrominance signals at a coarse value when it is judged by the image judgement part that the proportion is small and setting the subsampling rate of the chrominance signals at a fine value when it is judged by the image judgement part that the proportion is large.

9. A method for compressing image data that has a luminance signal and chrominance signals, comprising:
   setting a target compression rate of the image data;
   setting a common subsampling rate over an entire image of the chrominance signals in accordance with the target compression rate;
   performing subsampling processing only for the chrominance signals in the image data at the subsampling rate;
   subjecting the subsampling-processed image data to compression encoding in accordance with the target compression rate; and
   setting the subsampling rate of the chrominance signals at a coarse value when the target compression rate is high, and setting the subsampling rate of the chrominance signals at a fine value when the target compression rate is low.

* * * * *